United States Patent Office 3,830,948
Patented Aug. 20, 1974

3,830,948
METHOD FOR IMPROVING SHELF-LIFE OF BAKED GOODS
Leonard G. Fischer, College Point, and Monroe B. Sherain, and Klemens Strum, Brooklyn, N.Y., assignors to DCA Food Industries, Inc., New York, N.Y.
No Drawing. Continuation of abandoned application Ser. No. 51,689, July 1, 1970. This application June 18, 1973, Ser. No. 371,254
Int. Cl. A21d 13/08, 15/00
U.S. Cl. 426—363         7 Claims

ABSTRACT OF THE DISCLOSURE

The shelf-life of comestibles such as pastries or other baked goods is extended for indefinite periods of time by providing the products with a filling or topping comprising a combination of a whipped blend of sugar, fat, and an emulsifier, and a microbiologically stable system such as natural or artificial fruit preserves. When such products are placed in a moisture-proof package, a vapor equilibrium is established whereby the filling or topping meters vapor into the product at a rate approximating the rate at which the original water present in the product is being lost due to retrogradation of starch.

---

This is a continuation of application Ser. No. 51,689 filed July 1, 1970, and now abandoned.

The present invention relates to a composition and method for improving the shelf-life of comestibles. More particularly, the present invention is concerned with a composition and method for maintaining the amount of moisture originally present in a freshly baked product.

A common problem with baked goods is their tendency to stale when left on the shelf for any length of time. This staling effect has been related to a loss of moisture in the baked product, which loss results in a harsh and dry eating texture. Numerous attempts have been made in the art to overcome the staling problem. One prior art attempt to solve this problem involves the sealing of freshly baked goods in moisture proof packages. However, it has been found that such packaging does not overcome staling since the majority of the water loss in the product is due to redistribution of moisture in the baked goods itself. Thus, even if water or water vapor is prevented from escaping, it will not be available since it reacts with starches in the baked goods. As the starches retrograde, moisture will be lost and sufficient moisture for maintaining the eating characteristics of the product will not be available.

A second method which has been employed to reduce or prevent staling in baked goods is the addition of preservatives or other chemicals which provide a tenderizing effect and/or delay the redistribution and bonding of water within the product. The use of such ingredients has had only a limited effectiveness and under ideal packaging conditions may extend the shelf-life of the baked goods for up to 30 days. Moreover, such ingredients significantly add to the cost of the product and also reduce consumer acceptance.

It is an object of the present invention to provide a composition and method which extends the shelf life of comestibles such as baked goods for indeterminate periods of time in excess of 120 days.

It is a further object of this invention to provide a composition and method for providing moisture to a comestible product at a controlled rate which is governed by the rate at which the product loses available moisture.

The above and other objects of the invention are accomplished by providing a cake product with a topping or filling comprising a combination of an essentially moisture-free whipped blend of sugar, fat, and emulsifier with a microbiologically stable system composed of a natural fruit preserve or an artifical preserve comprising sugars, water, food acids, stabilizers, color and flavor agents in amounts similar to those found in natural fruit preserves. It has now been discovered that when such a mixture is combined with a cake, pastry or other baked product in the form of a filling, coating, topping or the like, and the combined product is placed in a sealed moisture-proof package, the freshly baked eating quality of the cake product may be maintained for indeterminate periods of time in excess of 90 days.

While not desiring to be limited to any particular theory, it is presently believed that the air entrained in the pre-whipped sugar-shortening-emulsifier blend tends to provide pathways for moisture vapor transmission from the artifical or natural fruit preserve both to the package atmosphere and directly into the baked product itself. As a result of the ability of this mixture to meter moisture from the preserve through the entrained air passages, a vapor equilibrium is established both between the package atmosphere and the pastry and between the filling or topping and the pastry. As moisture in the pastry is rendered unavailable due to retrogradation of starch, a shift in the vapor equilibrium is believed to occur and available water vapor from the special mixture of the invention is transmitted to the baked goods to replace the lost quantities of water. Thus, the shelf-life of the baked product is limited only by the amount of available moisture in the artificial or natural preserve and the tendency for biological growth in the food product. The biological growth may be minimized by the utilization of microbiologically stable preserves and, in addition, by maintaining a low equilibrium relative humidity in the package atmosphere. Moreover, by replacing only that moisture made unavailable through the staling phenomenon, the total amount of available moisture in the system is never appreciably altered and therefore the potential for microbial growth is not significantly affected.

A wide variety of sugars, fats, and emulsifiers may be employed to formulate the whipped portion of the special mixture of the invention. For example, typical sugars include sucrose, dextrose, lactose, levulose, fructose and combinations thereof, preferably, in powdered form.

Any of a wide variety and type of fats or shortening may also be employed. Typical shortenings include hydrogenated or nonhydrogenated fats or oils derived from animal, vegetable or fish sources or combinations thereof.

The selection of an emulsifier is not critical and a wide variety of conventional emulsifier materials which are well known in the art may be employed. Typical examples include mono- and di-glycerides; poly glycerol esters; propylene glycol esters; butylene glycol esters; lactated, acetylated or tartrated glycerol esters; polyoxylated sorbitan or sorbitol fatty acid esters; polyoxylated acids or combinations thereof.

The whipped portion of the special mixture may also include additional ingredients, for example, dried milk or dried buttermilk solids, salt, colors, flavors, stabilizers and starches.

The amounts of sugar, fats and emulsifier combined to formulate the whipped blend are not critical. Ordinarily the mixture will comprise 2 to 10 parts sugar, 2 to 10 parts fat or shortening and 0.01 to 1.0 parts emulsifier and will be essentially moisture-free when formed.

The whipped moisture distribution component of the novel composition of the invention is combined with an artificial or natural fruit preserve by folding or otherwise mixing the preserve with the pre-whipped blend so that an essentially heterogenous mixture results. The selection of a particular fruit preserve is not critical and such preserves may be prepared in accordance with any of the typical prior art techniques. For example, a blackberry, strawberry, grape, pineapple or raspberry preserve may be prepared by cooking the raw fruit in a standard fruit acid solution which also includes water, sugar and pectin in appropriate amounts. Ordinarily, small particles of preserve, approximately 1/16 to 3/32 inches in diameter, will be uniformly dispersed throughout the whipped blend. The amount of fruit preserve added to the whipped blend may vary widely and from 20 to 80% by weight of the total system, preferably 40–60% will be fruit preserve. Ordinarily the preserve will comprise from 25 to 50 wt. percent e.g. 35 wt. percent moisture.

Neither the amount of preserve nor the ratio of ingredients in the pre-whipped portion of the mixture are critical and a wide variety of combinations may be employed. It will be evident to those persons skilled in the art that the selection of ratios of ingredients and amounts of materials will depend upon the amount and rate of moisture transfer required for a particular baked product and that an optimum amount will be empirically determined in each instance. The amount of moisture available for transfer to the baked product and the rate of transfer may depend on the type and amount of water imbibers and sugar solids in the preserve; the amount of preserve incorporated in the pre-whipped blend; the ratio of preserve to baked product; the hydrophilic-lypophilic balance of the emulsifiers; and the amount of air entrained in the whipped blend. These factors will be adjusted to obtain the appropriate rate and amount of vapor transmission for each type or size of baked product.

The nature of the preserve may be altered by employing artificially prepared preserves in lieu of or in combination with natural fruit preserves. An artificial preserve, for example an artificially colored and flavored pectin jelly, may be prepared in accordance with well-known techniques. In one such typical technique, a citrus pectin is mixed with granulated sugar and added to warm water with continuous stirring. The mixture is cooked and thereafter additional sugar, flavoring agents, coloring agents and fruit acid solution are added to form the artificial preserve.

The manner in which the special composition of the invention is combined with the baked product is not critical. Thus, the composition may be injected as a filling; spread over the entire surface of the baked product as a coating; employed as a topping; or added in any other fashion in accordance with techniques which are well-known in the art.

The use of moisture-proof sealed packages for the filled or topped baked goods of the invention is critical. Such packaging and packaging techniques are well known in the prior art. One such typical package comprises a hermetically sealed pouch of laminated material including an inner layer of polyethylene (0.003 inches), a second layer of aluminum foil (0.035 inches), a second layer of polyethylene (0.0035 inches) and a lacquer coated paper outer layer.

The invention will be further understood by the following illustrative examples:

EXAMPLE 1

A sugar-shortening blend was prepared from the following ingredients:

Ingredients: Grams
- (a) Lard, deodorized and stabilized containing 8% esterine _____ 400
- (b) Hydrogenated Vegetable Shortening, 95–97° F. melt point, hard butter type _____ 400
- (c) Sugar, 6x powdered _____ 500
- (d) Dextrose, hydrate powdered _____ 200
- (e) Buttermilk, spray dried _____ 100

The above ingredients were combined by melting the vegetable shortening at 100° F., and thereafter combining the melted vegetable shortening with the lard and mixing until a uniform mixture was obtained. The sugars and dry milk solids were then combined and blended with the melted shortening to obtain a uniform mixture. Finally, the blended mixture was whipped to entrain air and whipping was continued until the blend achieved a density of 0.6 to 0.7 grams/cc. 534 grams of natural fruit preserve particles were folded into the pre-whipped blend so that the fruit preserve particles having a diameter of 1/16 to 3/32 inches were heterogeneously dispersed throughout the blend.

The combined preserve-whipped blend mixture was combined with cooled baked pastry shells measuring approximately 2" x 3" x 1" having an internal cavity equal to about one-third of their cross-sectional area. A conventional jelly filling pump of the type commonly used to fill jelly donuts was employed to fill the cavity with the preserve-whipped blend mixture.

Four dozen pieces of the filled baked product were placed by hand into preformed moisture-proof packages of the type previously described and sealed with a hot iron. The packaged product was left on a shelf at room temperature (70–85° F.) and humidity (30 to 70% relative humidity) for 90 days. At the end of that time period, the packages were opened and tested as follows:

(a) The just-opened package was smelled to determine if off-odors or a rancid smell existed. No odors were detected.

(b) The pastry surfaces were examined to determine overall appearance and texture and for mold growth or other deterioration under 200× magnification. No growth or deterioration was detected.

(c) The pastry was broken open and the interior surfaces were examined for mold growth. No growth was detected.

(d) The pastry was measured for microbiological flora using standard USDA methods. The results established that the pastry was wholesome.

(e) The pastry was eaten to determine its flavor, moisness, tenderness and other eating qualities and was found to be quite palatable.

A second sample was inspected approximately eleven months after it had first been prepared and packaged. The samples were still moist, tender and palatable. Microbiological analysis of these samples revealed lower bacteria and mold counts than most freshly baked goods.

Having thus described the general nature as well as specific embodiments in the invention, the true scope will now be pointed out in the appended claims.

What is claimed is:

1. A method for maintaining the moisture level in comestible products which comprises preparing an essentially moisture-free whipped blend comprising sugar, fat and an emulsifier, said whipped blend including entrained air passages, heterogenously dispersing a comestible material in said whipped blend, said comestible material being selected from the group consisting of artificial and natural fruit preserves, combining said whipped blend containing said heterogenously dispersed comestible material with a cake product and disposing said cake product in a moisture proof environment, said whipped blend and said preserve each being present in an amount sufficient to permit the transmission of water vapor from the preserve containing whipped blend to said cake product at a rate approximately equal to the rate of free water loss in said cake product.

2. The method of Claim 1 wherein said whipped preserve containing blend is combined with said cake product as a topping therefor.

3. The method of Claim 1 wherein said whipped preserve containing blend is combined with said cake product as a filling therefor.

4. The method of Claim 1 wherein said whipped blend has a density of 0.5 to 1.0 gms./cc.

5. The method of Claim 1 wherein said preserve comprises 20 to 80 wt. percent of said comestible composition.

6. The method of Claim 1 wherein said preserve comprises 30 to 50 wt. percent water.

7. The method of Claim 1 wherein said whipped blend comprises 2 to 10 parts of said sugar, 2 to 10 parts of said fat and 0.01 to 1.0 parts of said emulsifier.

References Cited
UNITED STATES PATENTS

| | | | |
|---|---|---|---|
| 3,199,988 | 8/1965 | Kozlik et al. | 99—139 |
| 3,600,196 | 8/1971 | Heine et al. | 99—134 A |

JAMES R. HOFFMAN, Primary Examiner

U.S. Cl. X.R.

426—152